(12) United States Patent
Li et al.

(10) Patent No.: US 10,558,073 B2
(45) Date of Patent: Feb. 11, 2020

(54) DISPLAY SUBSTRATE, LIQUID CRYSTAL DISPLAY PANEL AND FABRICATING METHOD THEREOF, AND LIQUID CRYSTAL DISPLAY APPARATUS

(71) Applicant: BOE TECHNOLOGY GROUP CO., LTD., Beijing (CN)

(72) Inventors: Hui Li, Beijing (CN); Hyunsic Choi, Beijing (CN); Jing Lv, Beijing (CN); Xue Dong, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/565,374

(22) PCT Filed: Nov. 4, 2016

(86) PCT No.: PCT/CN2016/104529
  § 371 (c)(1),
  (2) Date: Oct. 9, 2017

(87) PCT Pub. No.: WO2018/082003
  PCT Pub. Date: May 11, 2018

(65) Prior Publication Data
  US 2018/0307093 A1  Oct. 25, 2018

(51) Int. Cl.
  G02F 1/1335    (2006.01)
  G02F 1/1343    (2006.01)
  G02F 1/1362    (2006.01)
(52) U.S. Cl.
  CPC .. G02F 1/133512 (2013.01); G02F 1/134363 (2013.01); G02F 1/136286 (2013.01);
  (Continued)

(58) Field of Classification Search
  CPC ......... G02F 1/133512; G02F 1/134363; G02F 1/136286; G02F 2201/123;
  (Continued)

(56) References Cited

U.S. PATENT DOCUMENTS 7,259,820 B2 * 8/2007 Matsumoto ........... G02F 1/1345
                                                      349/111
2005/0140857 A1  6/2005 Kim
2015/0015836 A1  1/2015 Huang

FOREIGN PATENT DOCUMENTS

CN       103345096 A    10/2013
KR     20080020309 A     3/2008
(Continued)

OTHER PUBLICATIONS

International Search Report & Written Opinion dated Jul. 26, 2017, regarding PCT/CN2016/104529.

Primary Examiner — Sonya D. McCall-Shepard
(74) Attorney, Agent, or Firm — Intellectual Valley Law, P.C.

(57) ABSTRACT

The present application discloses a liquid crystal display panel including an array substrate having a data line layer including a plurality of columns of data lines; a counter substrate facing the array substrate, including a base substrate and a conductive material layer on the base substrate having a plurality of conductive material columns for preventing light leakage; and a black matrix layer having a plurality of black matrix columns corresponding to the plurality of conductive material columns and the plurality of columns of data lines.

20 Claims, 8 Drawing Sheets

(52) U.S. Cl.
CPC .. *G02F 2201/121* (2013.01); *G02F 2201/123* (2013.01); *G02F 2201/40* (2013.01)

(58) Field of Classification Search
CPC ........... G02F 2201/121; G02F 2201/40; G02F 2001/133302; G02F 1/13336; G02F 2001/133368; G02F 2001/134345; G02F 2001/134318; G02F 2001/134372; H01L 27/1218; H01L 27/1262; H01L 27/3276; H01L 27/3288; H01L 27/3297; H01L 27/124

See application file for complete search history.

(56) References Cited

FOREIGN PATENT DOCUMENTS

| | | | |
|---|---|---|---|
| KR | 20090122092 | A | 11/2009 |
| KR | 20120015162 | A | 2/2012 |
| TW | 201612596 | A | 4/2016 |

* cited by examiner

US 10,558,073 B2

DISPLAY SUBSTRATE, LIQUID CRYSTAL DISPLAY PANEL AND FABRICATING METHOD THEREOF, AND LIQUID CRYSTAL DISPLAY APPARATUS

CROSS-REFERENCE TO RELATED APPLICATION

This application is a national stage application under 35 U.S.C. § 371 of International Application No. PCT/CN2016/104529 filed Nov. 4, 2016, the contents of which are incorporated by reference in the entirety.

TECHNICAL FIELD

The present invention relates to a display substrate, a liquid crystal display panel and a fabricating method thereof, and a liquid crystal display apparatus having the same.

BACKGROUND

Liquid crystal display panel has found a wide variety of applications. Typically, a liquid crystal display panel includes a counter substrate and an array substrate facing each other. Thin film transistors, gate lines, data lines, pixel electrodes, common electrodes, and common electrode signal lines are disposed on the array substrate and counter substrate. Between the two substrates, a liquid crystal material is injected to form a liquid crystal layer. One common problem associated with the liquid crystal display panel is light leakage. To prevent light leakage, a black matrix is placed on the counter substrate. A liquid crystal display panel having a larger black matrix can better prevent light leakage. However, an aperture ratio of the liquid crystal display apparatus is reduced by using a black matrix with a larger area.

SUMMARY

In one aspect, the present disclosure provides a liquid crystal display panel comprising an array substrate comprising a data line layer including a plurality of columns of data lines; a counter substrate facing the array substrate, comprising a base substrate and a conductive material layer on the base substrate comprising a plurality of conductive material columns for preventing light leakage; and a black matrix layer comprising a plurality of black matrix columns corresponding to the plurality of conductive material columns and the plurality of columns of data lines; wherein a projection of each of the plurality of conductive material columns on the base substrate at least partially overlaps with that of a corresponding black matrix column.

Optionally, the conductive material layer is configured to be provided with a common electrode voltage.

Optionally, the conductive material layer is a floating electrode layer.

Optionally, a width of each of the plurality of conductive material columns is substantially equal to or less than that of the corresponding black matrix column.

Optionally, a ratio of a width of each of the plurality of conductive material columns to a width of the corresponding black matrix column is in the range of approximately 1:10 to approximately 1.1:1.

Optionally, a ratio of a width of each of the plurality of conductive material columns to a width of a corresponding column of data line is in the range of approximately 0.8:1 to approximately 1.2:1.

Optionally, the width of each of the plurality of conductive material columns is substantially equal to the width of the corresponding column of data line.

Optionally, the array substrate comprises a common electrode layer; a first insulating layer on the common electrode layer, the data line layer on a side of the first insulating layer distal to the common electrode layer, a second insulating layer on a side of the data line layer distal to the first insulating layer; and a pixel electrode layer on a side of the second insulating layer distal to the data line layer; wherein the common electrode layer is electrically connected to the conductive material layer in the counter substrate; a ratio of a width of each of the plurality of conductive material columns to a width of a corresponding column of data line is in the range of approximately 0.8:1 to approximately 1.2:1.

Optionally, the conductive material layer is made of a transparent metal material.

Optionally, the black matrix layer is in the counter substrate; and the conductive material layer is on a side of the black matrix layer proximal to the base substrate.

In another aspect, the present disclosure provides a method of fabricating a liquid crystal display panel comprising forming an array substrate and forming a counter substrate facing the array substrate; wherein forming the array substrate comprises forming a data line layer including a plurality of columns of data lines; and forming the counter substrate comprises forming a conductive material layer comprising a plurality of conductive material columns for preventing light leakage on a base substrate; the method further comprising forming a black matrix layer comprising a plurality of black matrix columns corresponding to the plurality of conductive material columns and the plurality of columns of data lines; wherein the black matrix layer is formed so that a projection of each of the plurality of conductive material columns on the base substrate at least partially overlaps with that of a corresponding black matrix column.

Optionally, forming the array substrate further comprises forming a common electrode layer electrically connected to the conductive material layer in the counter substrate.

Optionally, a ratio of a width of each of the plurality of conductive material columns to a width of a corresponding column of data line is in the range of approximately 0.8:1 to approximately 1.2:1.

Optionally, forming the array substrate comprises forming a common electrode layer; forming a first insulating layer on the common electrode layer, forming the data line layer on a side of the first insulating layer distal to the common electrode layer; forming a second insulating layer on a side of the data line layer distal to the first insulating layer; and forming a pixel electrode layer on a side of the second insulating layer distal to the data line layer; wherein the common electrode layer is formed to be electrically connected to the conductive material layer in the counter substrate; a ratio of a width of each of the plurality of conductive material columns to a width of a corresponding column of data line is in the range of approximately 0.8:1 to approximately 1.2:1.

In another aspect, the present disclosure provides a display substrate comprising a base substrate; a black matrix layer on the base substrate comprising a plurality of black matrix columns; and a conductive material layer on the base substrate comprising a plurality of conductive material columns corresponding to the plurality of black matrix columns; wherein a projection of each of the plurality of conductive material columns on the base substrate at least partially overlaps with that of a corresponding black matrix column.

Optionally, a width of each of the plurality of conductive material columns is substantially equal to or less than that of the corresponding black matrix column.

Optionally, a width of each of the plurality of conductive material columns is in a range of approximately 1.75 µm to approximately 5.25 µm.

Optionally, a ratio of a width of each of the plurality of conductive material columns to a width of the corresponding black matrix column is in the range of approximately 1:10 to approximately 1.1:1.

Optionally, the conductive material layer is made of a transparent metal material.

Optionally, the conductive material layer is on a side of the black matrix layer proximal to the base substrate.

In another aspect, the present disclosure provides a liquid crystal display apparatus comprising a liquid crystal display panel described herein or fabricated by a method described herein.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

Figure 1:
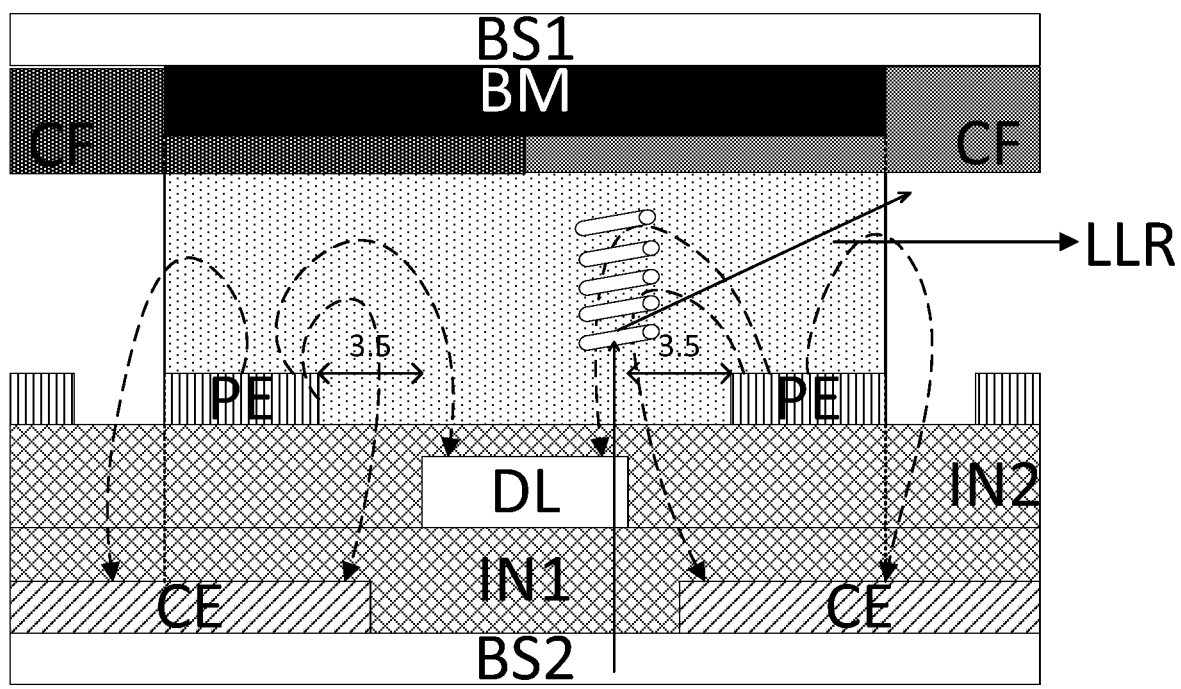
FIG. 1 is a diagram illustrating the structure of a conventional display panel.

FIG. 1 is a diagram illustrating the structure of a conventional display panel.

Referring to FIG. 1, the convention display panel is an advanced super dimension switch (ADS) liquid crystal display panel. The display panel in FIG. 1 includes a counter substrate (top) and an array substrate (bottom). The counter substrate includes a black matrix BM on a base substrate BS1, and a color filter layer CF on a side of the black matrix BM distal to the base substrate BS1. The array substrate includes a common electrode layer CE on a base substrate BS2, a first insulating layer IN1 on a side of the common electrode layer CE distal to the base substrate BS2, a data line layer DL on a side of the first insulating layer IN1 distal to the base substrate BS2 and the common electrode layer CE, a second insulating layer IN2 on a side of the data line layer DL distal to the first insulating layer IN1, and a pixel electrode PE on a side of the second insulating layer IN2 distal to the data line layer DL. The data line DL shown in FIG. 1 is in an inter-subpixel region of a liquid crystal display panel, i.e., the data line DL is disposed between two adjacent subpixels. The black matrix BM in FIG. 1 is in the inter-subpixel region, and the color filter layer CF is in the subpixel region.

As used herein, a subpixel region refers to a light emission region of a subpixel, such as a region corresponding to a pixel electrode in a liquid crystal display, or a region corresponding to a light emissive layer in an organic light emitting display. Optionally, a pixel may include a number of separate light emission regions corresponding to a number of subpixels in the pixel. Optionally, the subpixel region is a light emission region of a red color subpixel. Optionally, the subpixel region is a light emission region of a green color subpixel. Optionally, the subpixel region is a light emission region of a blue color subpixel. Optionally, the subpixel region is a light emission region of a white color subpixel. As used herein, an inter-subpixel region refers to a region between adjacent subpixel regions, such as a region corresponding to a black matrix in a liquid crystal display, or a region corresponding a pixel definition layer in an organic light emitting display. Optionally, the inter-subpixel region is a region between adjacent subpixel regions in a same pixel. Optionally, the inter-subpixel region is a region between two adjacent subpixel regions from two adjacent pixels. Optionally, the inter-subpixel region is a region between a subpixel region of a red color subpixel and a subpixel region of an adjacent green color subpixel. Optionally, the inter-subpixel region is a region between a subpixel region of a red color subpixel and a subpixel region of an adjacent blue color subpixel. Optionally, the inter-subpixel region is a region between a subpixel region of a green color subpixel and a subpixel region of an adjacent blue color subpixel.

As shown in FIG. 1, the conventional display panel suffers from a loss of aperture ratio due to a disclination line caused by fringe electric field around the data line DL. Due to the fringe electric field around the data line DL, there exists a light leakage area LLR in this area. To prevent the light leakage, a black matrix BM having a width equal to or larger than that of the light leakage area LLR is required in a corresponding region in the counter substrate.

Although the black matrix BM can prevent light leakage, it is discovered in the present disclosure that a large black matrix layer on the display panel results in significant loss of aperture ratio. For example, in a typical liquid crystal display panel, the data line has a width of approximately 3.5 µm, and the distance between an adjacent pixel electrode and the data line is approximately 3.5 µm. To adequately prevent light leakage due to the fringe electric field, a black matrix having a width as large as 24 µm is required. This design results in a relatively low aperture ratio. The issue becomes particularly problematic in a high resolution display panel.

Accordingly, the present invention provides, inter alia, a display substrate, a high aperture ratio liquid crystal display panel and a high aperture ratio liquid crystal display apparatus having the same that substantially obviate one or more of the problems due to limitations and disadvantages of the related art. In one aspect, the present disclosure provides a liquid crystal display panel having a counter substrate and an array substrate facing the counter substrate. In some embodiments, the liquid crystal display panel further includes a black matrix layer comprising a plurality of black matrix columns (and optionally, a plurality of black matrix rows intersecting the plurality of black matrix columns). Optionally, the black matrix layer is in the array substrate. Optionally, the black matrix layer is in the counter substrate. In some embodiments, the counter substrate of the liquid crystal display panel includes a base substrate and a conductive material layer on the base substrate including a plurality of conductive material columns for preventing light leakage, the plurality of conductive material columns corresponding to the plurality of black matrix columns. In some embodiments, the array substrate of the liquid crystal display panel includes a data line layer including a plurality of columns of data lines corresponding to the plurality of conductive material columns in the counter substrate, and corresponding to the plurality of black matrix columns. The array substrate additionally may include a gate line layer including a plurality of rows of gate lines. The gate line layer and the data line layer are disposed in the inter-subpixel region of the liquid crystal display panel. The plurality of rows of gate lines and the plurality of columns of data lines intersect each other, defining a plurality of subpixels. The array substrate may further include other components of the liquid crystal display panel such as a base substrate, an active layer, a gate electrode, a source electrode and a drain electrode, a pixel electrode electrically connected to the drain electrode, a common electrode signal line, and a common electrode electrically connected to the common electrode signal line. Optionally, the pixel electrode is on a side of the common electrode distal to the base substrate in the array substrate. Optionally, the common electrode is on a side of the pixel electrode distal to the base substrate in the array substrate.

In some embodiments, a projection of each of the plurality of conductive material columns on the base substrate at least partially overlaps with that of a corresponding black matrix column. Optionally, the black matrix column is wider than the conductive material column, e.g., on both sides. Optionally, the conductive material column is wider than the black matrix column, e.g., on both sides. Optionally, a width of the black matrix column is substantially equal to that of the conductive material column. Optionally, the projection of each of the plurality of conductive material columns on the base substrate is substantially within that of the corresponding black matrix column. Optionally, the projection of each of the plurality of black matrix columns on the base substrate is substantially within that of the corresponding conductive material column.

The present liquid crystal display panels may be any of appropriate liquid crystal display panels such as an ADS liquid crystal display panel, an in-plane liquid crystal display panel, or any liquid crystal display panel in which a fringe electric field may occur around the data line region. Moreover, the present liquid crystal display panel may be one of a transmissive type display panel and a reflective type display panel. Optionally, the present liquid crystal display panel is an ADS liquid crystal display panel.

In some embodiments, the conductive material layer is a floating electrode layer. Optionally, the conductive material layer in the counter substrate is configured to be provided with a low voltage, e.g., a common electrode voltage.

In some embodiments, the conductive material layer in the counter substrate is configured to be provided with a low voltage, e.g., a common electrode voltage. For example, the conductive material layer may be electrically connected to a low voltage terminal in the display panel. Optionally, the conductive material layer is electrically connected to ground. Optionally, the conductive material layer is electrically connected to a common electrode or a common electrode signal line, e.g., a common electrode layer or a common electrode signal line in the array substrate. Optionally, the conductive material layer is electrically connected to the common electrode layer or the common electrode signal line in the array substrate through a lead wire. Optionally, the conductive material layer is electrically connected to the common electrode layer or the common electrode signal line in the array substrate through a sealant layer for sealing the array substrate and the counter substrate together, the sealant layer including a plurality of conductive components (e.g., gold balls).

Optionally, the conductive material layer is a black matrix layer. Optionally, the conductive material layer constitutes a portion of the black matrix layer.

Various appropriate conductive materials and various appropriate fabricating methods may be used to make the conductive material layer in the counter substrate. For example, a conductive material may be deposited on the substrate (e.g., by sputtering, vapor deposition, solution coating, or spin coating); and patterned (e.g., by lithography such as a wet etching process) to form the conductive material layer. Examples of appropriate conductive materials for making the conductive material layer include, but are not limited to, various metal materials such as nano-silver, molybdenum, aluminum, silver, chromium, tungsten, titanium, tantalum, copper, and alloys or laminates containing the same; and various conductive metal oxides such as indium tin oxide. Optionally, the conductive material layer is made of a transparent metal material, e.g., nano-silver.

Various appropriate black materials and various appropriate fabricating methods may be used to make the black matrix layer in the counter substrate. For example, a black material may be deposited on the substrate (e.g., by sputtering, vapor deposition, solution coating, or spin coating);

and patterned (e.g., by lithography such as a wet etching process) to form the conductive material layer. Examples of appropriate black materials for making the black matrix layer include, but are not limited to, organic or inorganic black materials. Optionally, the black matrix layer is made of an organic black material such as a pigment-containing resin. Optionally, the black matrix layer is made of an insulating black material.

Figure 2:
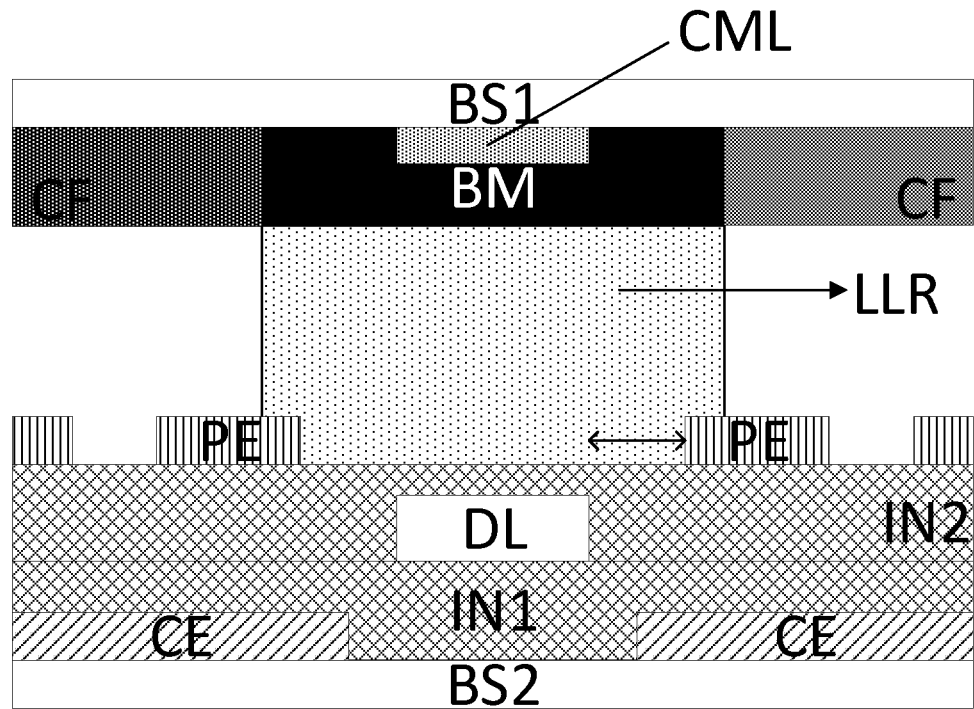
FIG. 2 is a diagram illustrating the structure of a liquid crystal display panel in some embodiments according to the present disclosure.

FIG. 2 is a diagram illustrating the structure of a liquid crystal display panel in some embodiments according to the present disclosure. Referring to FIG. 2, the liquid crystal display panel includes a counter substrate and an array substrate facing the counter substrate. The counter substrate of the liquid crystal display panel includes a base substrate BS1; a black matrix layer BM on the base substrate BS1; and a conductive material layer CML on the base substrate BS1. The black matrix layer BM includes a plurality black matrix rows and a plurality of black matrix columns intersecting each other. The conductive material layer CML includes a plurality of conductive material columns corresponding to the plurality of black matrix columns. A projection of each of the plurality of conductive material columns CML on the base substrate BS1 at least partially overlaps with that of a corresponding black matrix column BM. For example, in FIG. 2, the projection of the black matrix column BM completely cover that of the conductive material column CML, i.e., the projection of the conductive material column CML on the base substrate BS1 is within the projection of the black matrix column BM on the base substrate BS1.

Referring to FIG. 2, the array substrate of the liquid crystal display panel includes a data line layer DL, a common electrode layer CE, and a pixel electrode layer PE. Specifically, the array substrate includes a common electrode layer CE on the base substrate BS2, a first insulating layer IN1 on a side of the common electrode layer CE distal to the base substrate BS2; a data line layer DL on a side of the first insulating layer IN1 distal to the common electrode layer CE; a second insulating layer IN2 on a side of the data line layer DL distal to the first insulating layer IN1; and a pixel electrode layer PE on a side of the second insulating layer IN2 distal to the data line layer DL.

Optionally, the conductive material layer CML is on a side of the black matrix layer BM proximal to the base substrate BS1 in the counter substrate (as shown in FIG. 2).

Optionally, the counter substrate further includes a color filter layer CF. Optionally, the color filter layer CF includes a plurality of color filter blocks of different colors. For example, the color filter layer CF may include a red color filter block, a green color filter block, and a blue color filter block. The color filter layer is substantially in the subpixel region, and the black matrix layer BM is substantially in the inter-subpixel region.

The data line layer DL includes a plurality of columns of data lines corresponding to the plurality of conductive material columns CML in the counter substrate. In FIG. 2, the width of each of the plurality of conductive material columns CML is substantially equal to the width of the corresponding column of data line DL.

Figure 3:
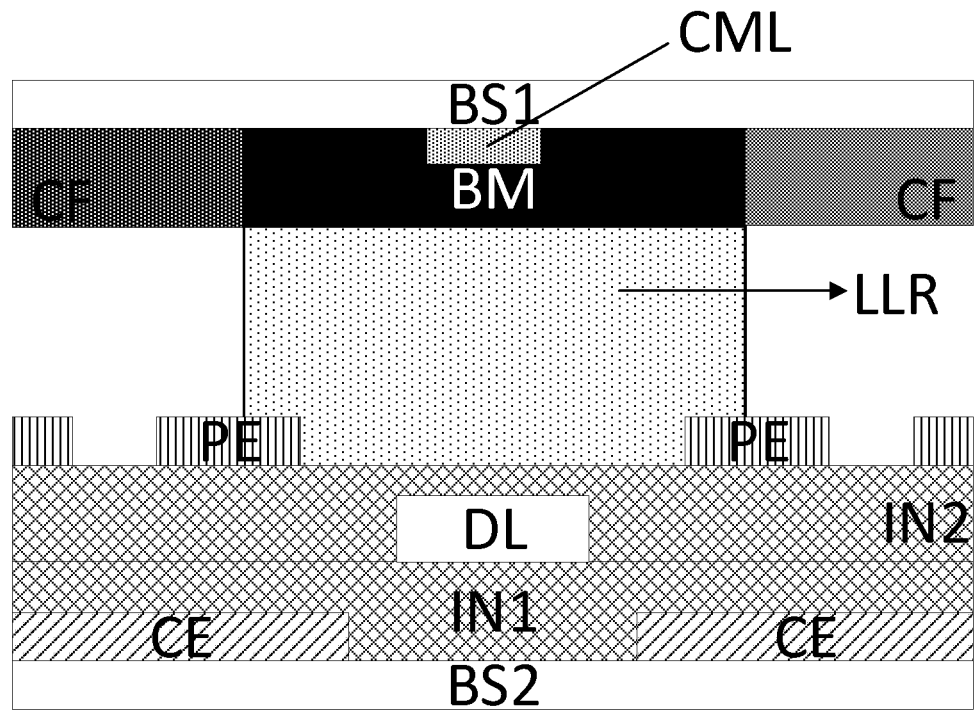
FIG. 3 is a diagram illustrating the structure of a liquid crystal display panel in some embodiments according to the present disclosure.

FIG. 3 is a diagram illustrating the structure of a liquid crystal display panel in some embodiments according to the present disclosure. Referring to FIG. 3, a width of the conductive material column CML in the embodiment is smaller than that of a corresponding data line DL.

Figure 4:
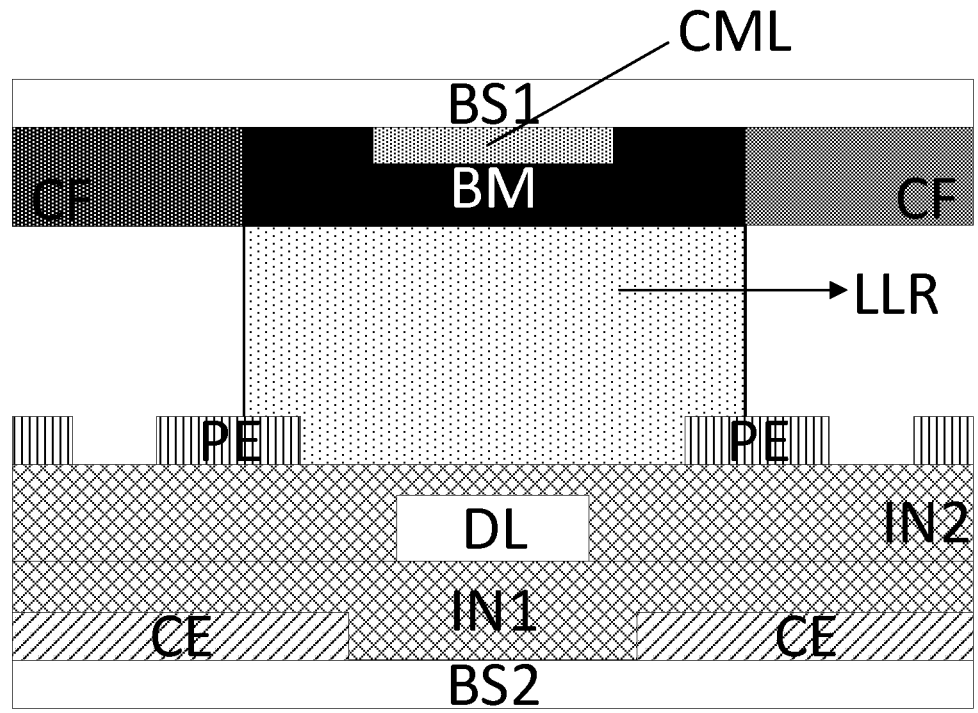
FIG. 4 is a diagram illustrating the structure of a liquid crystal display panel in some embodiments according to the present disclosure.

FIG. 4 is a diagram illustrating the structure of a liquid crystal display panel in some embodiments according to the present disclosure. Referring to FIG. 4, a width of the conductive material column CML in the embodiment is larger than that of a corresponding data line DL.

In some embodiments, a projection of each of the plurality of columns of data lines on the base substrate BS2 at least partially overlaps with that of a corresponding conductive material column CML. Optionally, the data line DL is wider than the conductive material column CML, e.g., on both sides. Optionally, the conductive material column CML is wider than the data line DL, e.g., on both sides. Optionally, a width of the data line DL is substantially equal to that of the conductive material column CML. Optionally, the projection of each of the plurality of conductive material columns on the base substrate BS2 is substantially within that of the corresponding data line DL. Optionally, the projection of each of the plurality of data lines DL on the base substrate BS2 is substantially within that of the corresponding conductive material column CML.

In some embodiments, a ratio of a width of each of the plurality of conductive material columns to a width of a corresponding column of data line is in the range of approximately 0.5:1 to approximately 1.5:1, e.g., approximately 0.6:1 to approximately 1.4:1, approximately 0.7:1 to approximately 1.3:1, approximately 0.8:1 to approximately 1.2:1, approximately 0.9:1 to approximately 1.1:1, or approximately 0.95:1 to approximately 1.05:1. Optionally, the ratio of the width of each of the plurality of conductive material columns to the width of a corresponding column of data line is in the range of approximately 0.8:1 to approximately 1.2:1.

In some embodiment, a width of the conductive material column is in the range of approximately 1.75 µm to approximately 5.25 µm, e.g., approximately 2.1 µm to approximately 4.9 µm, approximately 2.45 µm to approximately 4.55 µm, approximately 2.8 µm to approximately 4.2 µm, approximately 3.15 µm to approximately 3.85 µm, or approximately 3.325 µm to approximately 3.675 µm. Optionally, the width of the conductive material column is in the range of approximately 2.8 µm to approximately 4.2 µm. Optionally, the width of the conductive material column is approximately 3.5 µm.

In some embodiment, a width of the black matrix column is in the range of approximately 23 µm to approximately 20 µm, e.g., approximately 22 µm to approximately 20 µm, approximately 21 µm to approximately 20 µm. Optionally, a width of the black matrix column is approximately 20 µm.

Figure 5:
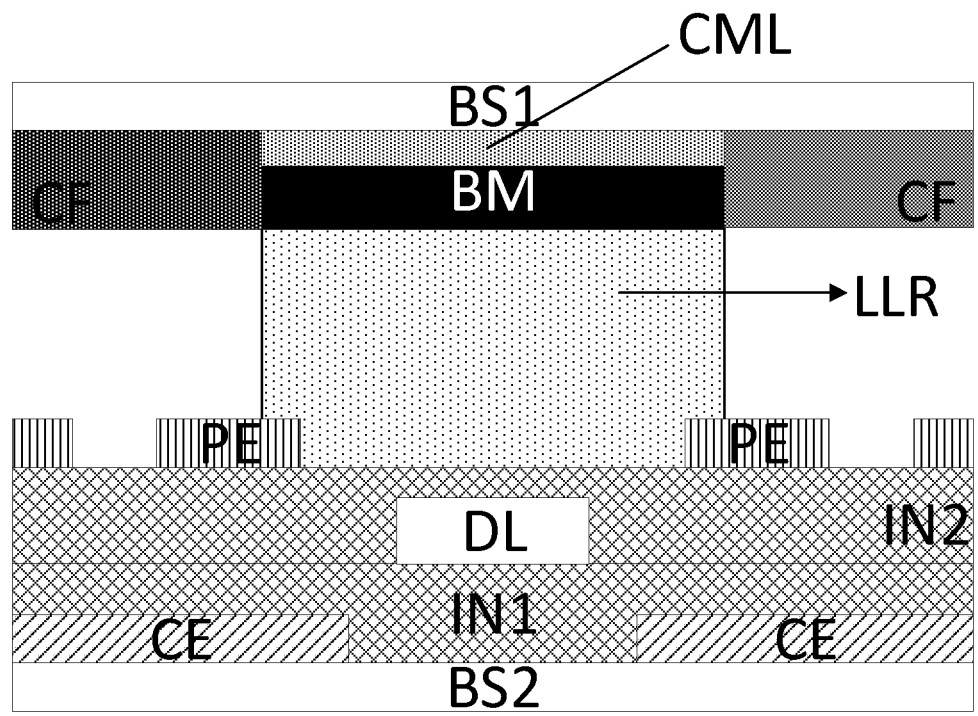
FIG. 5 is a diagram illustrating the structure of a liquid crystal display panel in some embodiments according to the present disclosure.
Figure 6:
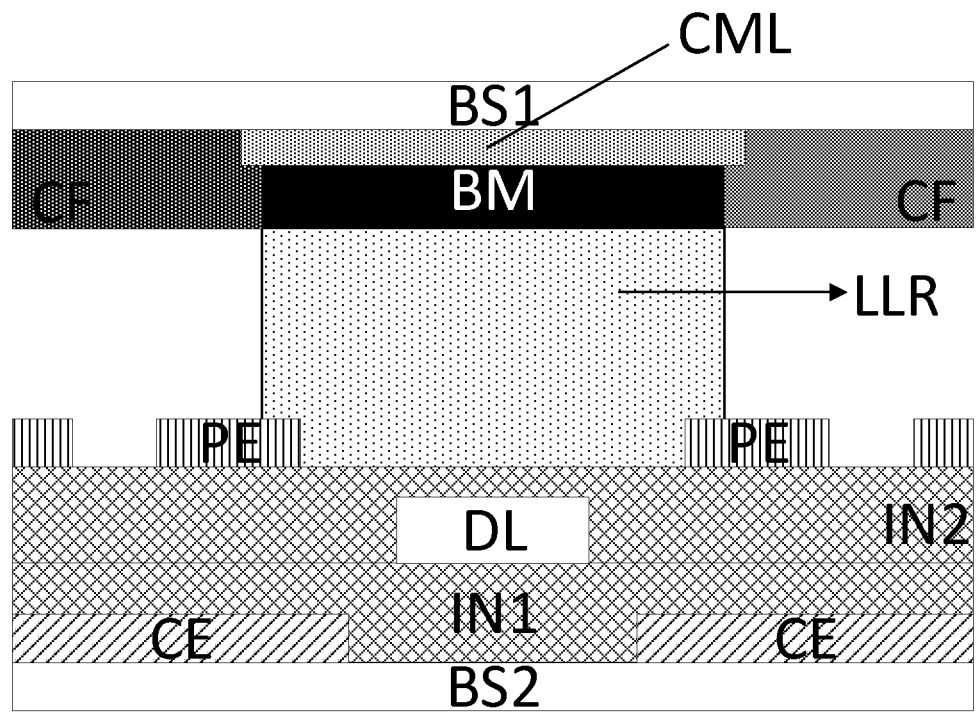
FIG. 6 is a diagram illustrating the structure of a liquid crystal display panel in some embodiments according to the present disclosure.

In FIG. 2, a width of the conductive material column CML in the embodiment is smaller than that of a corresponding black matrix column BM. FIG. 5 is a diagram illustrating the structure of a liquid crystal display panel in some embodiments according to the present disclosure. Referring to FIG. 5, a width of the conductive material column CML in the embodiment is substantially equal to that of a corresponding black matrix column BM. FIG. 6 is a diagram illustrating the structure of a liquid crystal display panel in some embodiments according to the present disclosure. Referring to FIG. 6, a width of the conductive material column CML in the embodiment is larger than that of a corresponding black matrix column BM.

In some embodiments, a width of each of the plurality of conductive material columns is substantially equal to or less than that of the corresponding black matrix column. By having this design, the aperture ratio of the display panel would not be substantially affected by the inclusion of the conductive material layer, e.g., when the conductive material layer is made of a non-transparent metal. Optionally, a ratio of a width of each of the plurality of conductive material columns to a width of the corresponding black matrix column is in the range of approximately 1:10 to approximately 1.1:1, e.g., approximately 1:10 to approximately 2.5:10, approximately 1.5:10 to approximately 1:5, approximately 1.7:10 to approximately 1.8:10. Optionally, the ratio of a width of each of the plurality of conductive material columns to the width of the corresponding black matrix column is approximately 1.75:10.

Figure 7:
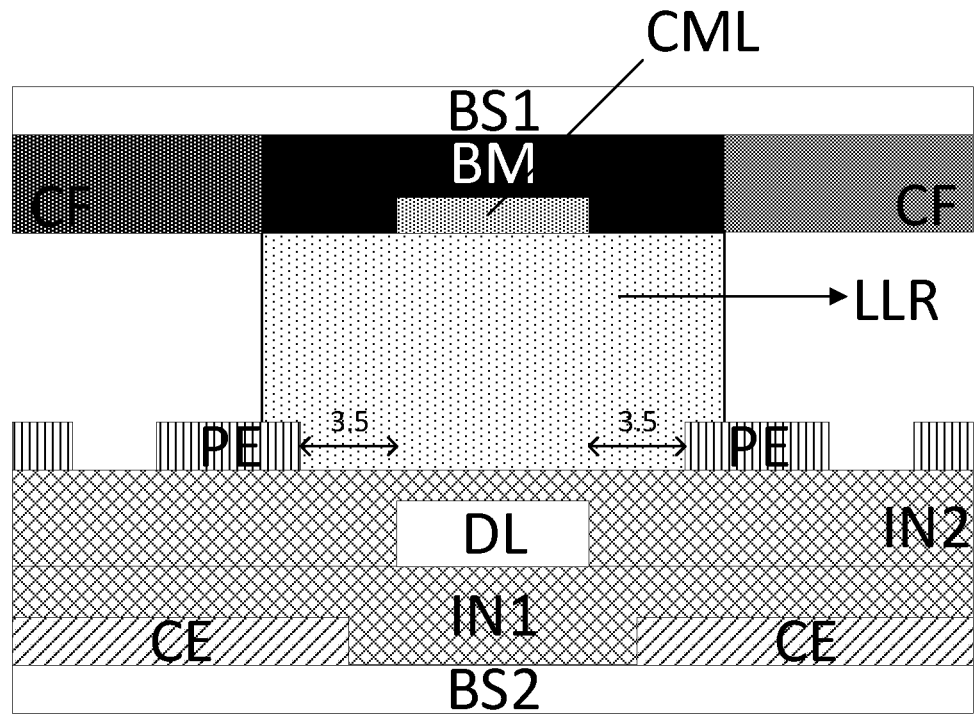
FIG. 7 is a diagram illustrating the structure of a liquid crystal display panel in some embodiments according to the present disclosure.

In FIG. 2, the conductive material layer CML is on a side of the black matrix layer BM proximal to the base substrate BS1 in the counter substrate, i.e., the black matrix layer BM is on a side of the conductive material layer CML distal to the base substrate BS1 in the counter substrate. FIG. 7 is a diagram illustrating the structure of a liquid crystal display panel in some embodiments according to the present disclosure. Referring to FIG. 7, the black matrix layer BM is on a side of the conductive material layer CML proximal to the base substrate BS1 in the counter substrate, i.e., the conductive material layer CML is on a side of the black matrix layer BM distal to the base substrate BS1 in the counter substrate. Optionally, the black matrix layer may have two sub-layers, and the conductive material layer is sandwiched between the two sub-layers of the black matrix layer.

Figure 8:
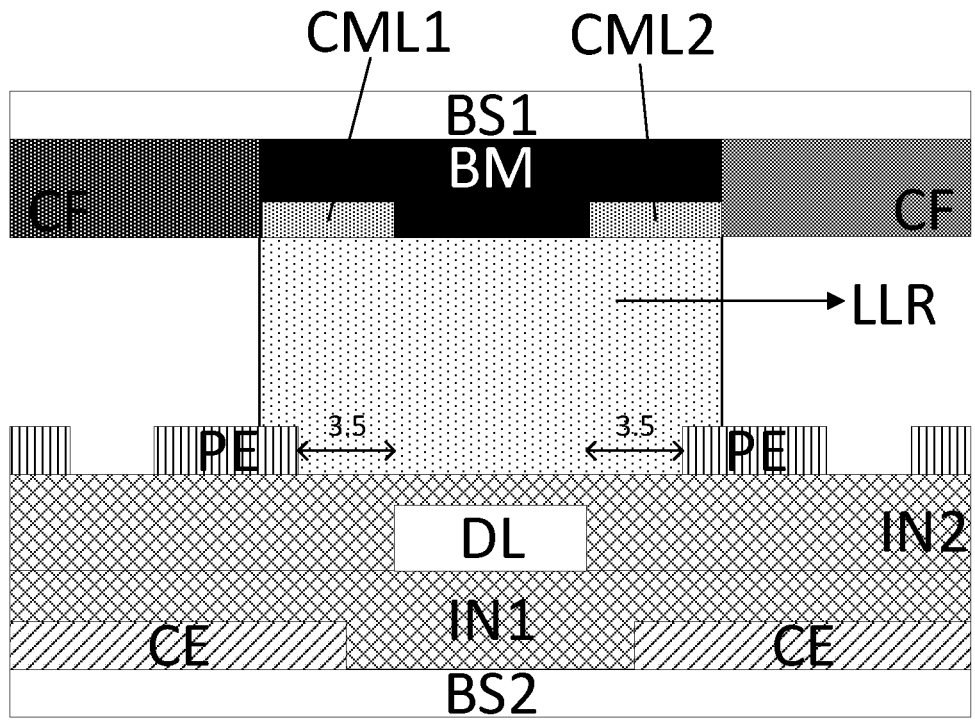
FIG. 8 is a diagram illustrating the structure of a liquid crystal display panel in some embodiments according to the present disclosure.

FIG. 8 is a diagram illustrating the structure of a liquid crystal display panel in some embodiments according to the present disclosure. Referring to FIG. 8, the conductive material layer includes two sub-layers, CML1 and CML2. Projections of the first sub-layer CML1 and the second sub-layer CM2 do not overlap with that of the corresponding data line DL.

Table 1 is a summary of light leakage distances and light leakage rates in some exemplary liquid crystal display panels in some embodiments. In the conventional display panel, the data line has a width of 3.5 μm, the distance between the data line and an adjacent pixel electrode is 3.5 μm, and the black matrix column has a width of 24 μm. In Panels 1-6, the data line has a width of 3.5 μm, and the distance between the data line and an adjacent pixel electrode is 3.5 μm. In Panel 1, the conductive material column has a width substantially equal to that of the black matrix column. In Panel 2, the conductive material column has a width approximately 1 μm larger than that of the black matrix column. In Panel 3, the conductive material column has a width approximately 1 μm smaller than that of the black matrix column. In Panel 4, the conductive material column has a width approximately 5 μm smaller than that of the black matrix column. In Panel 5, the conductive material column has a width substantially equal to that of the data line. In Panel 6, the conductive material column has a width approximately 2 μm smaller than that of the data line.

Table 1. Light leakage distances and light leakage rates in some exemplary liquid crystal display panels in some embodiments according to the present disclosure.

|  | Light leakage distance (μm) | Light leakage rate |
| --- | --- | --- |
| Conventional display panel | 12.05 | 59.67% |
| Panel 1 | 10.55 | 37.46% |
| Panel 2 | 10.55 | 37.74% |
| Panel 3 | 10.55 | 37.64% |
| Panel 4 | 10.5 | 37.54% |
| Panel 5 | 10.05 | 13.14% |
| Panel 6 | 11.55 | 44.78% |

In Panel 1, the black matrix column has a width of approximately 21 μm, the ratio of the width of the conductive material column to the width of the corresponding black matrix column is approximately 1:1, the ratio of the width of the conductive material column to the width of the corresponding data line is 6:1.

In Panel 2, the black matrix column has a width of approximately 21 μm, the ratio of the width of the conductive material column to the width of the corresponding black matrix column is approximately 1.04:1, the ratio of the width of the conductive material column to the width of the corresponding data line is 6.3:1.

In Panel 3, the black matrix column has a width of approximately 21 μm, the ratio of the width of the conductive material column to the width of the corresponding black matrix column is approximately 0.95:1, the ratio of the width of the conductive material column to the width of the corresponding data line is 5.7:1.

In Panel 4, the black matrix column has a width of approximately 21 μm, the ratio of the width of the conductive material column to the width of the corresponding black matrix column is approximately 0.76:1, the ratio of the width of the conductive material column to the width of the corresponding data line is 4.6:1.

In Panel 5, the black matrix column has a width of approximately 20 μm, the ratio of the width of the conductive material column to the width of the corresponding black matrix column is approximately 1.75:10, the ratio of the width of the conductive material column to the width of the corresponding data line is 1:1.

In Panel 6, the black matrix column has a width of approximately 23 μm, the ratio of the width of the conductive material column to the width of the corresponding black matrix column is approximately 0.65:10, the ratio of the width of the conductive material column to the width of the corresponding data line is 4.3:10.

As illustrated in Table 1, inclusion of a conductive material layer in the counter substrate significantly decreases the light leakage distance (e.g., by 4% to 17%) and the light leakage rate (e.g., by 25% to 78%). Because the light leakage distance and light leakage rate are significantly reduced, the width of the black matrix can be correspondingly reduced as well (e.g., by 17%), leading to much improved aperture ratio.

Figure 9:
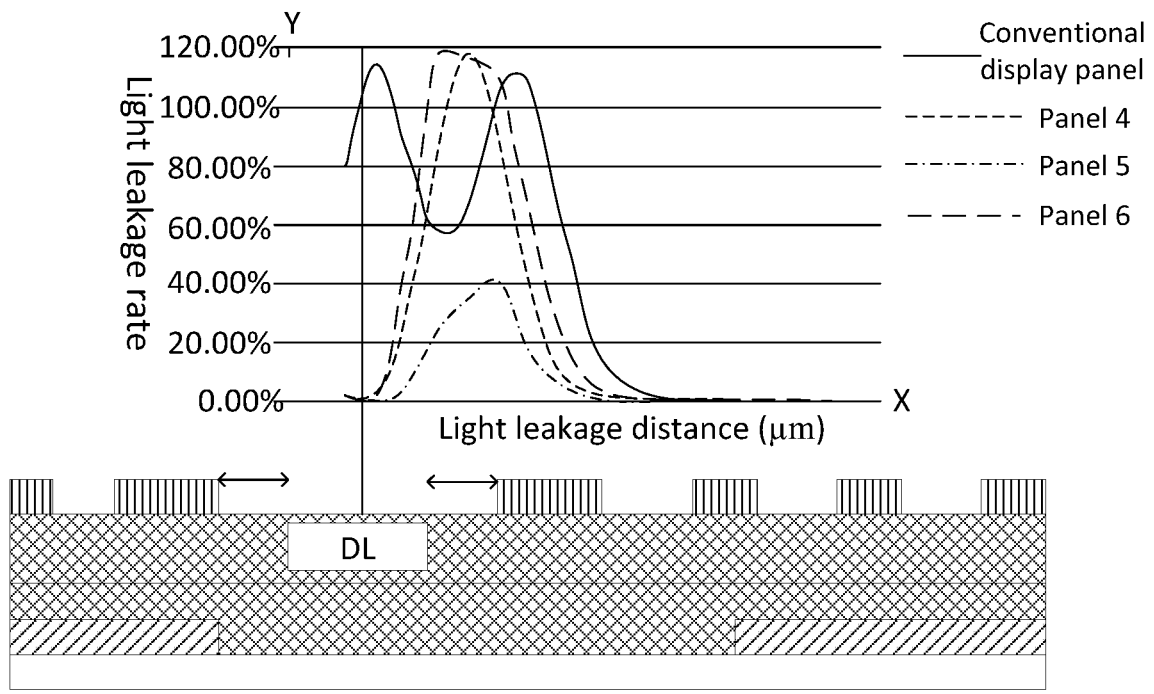
FIG. 9 is a diagram illustrating light leakage distances and light leakage rates in some exemplary liquid crystal display panels in some embodiments according to the present disclosure.

FIG. 9 is a diagram illustrating light leakage distances and light leakage rates in some exemplary liquid crystal display panels in some embodiments according to the present disclosure. As shown in FIG. 9, the light leakage distance is a distance along the X-axis between a mid-point of the data line and a point at which the light leakage rate equals to 0.3%, when a black matrix layer is not included in the display panel. The light leakage rate is the light transmittance rate of the back light of the display panel.

Figure 10:
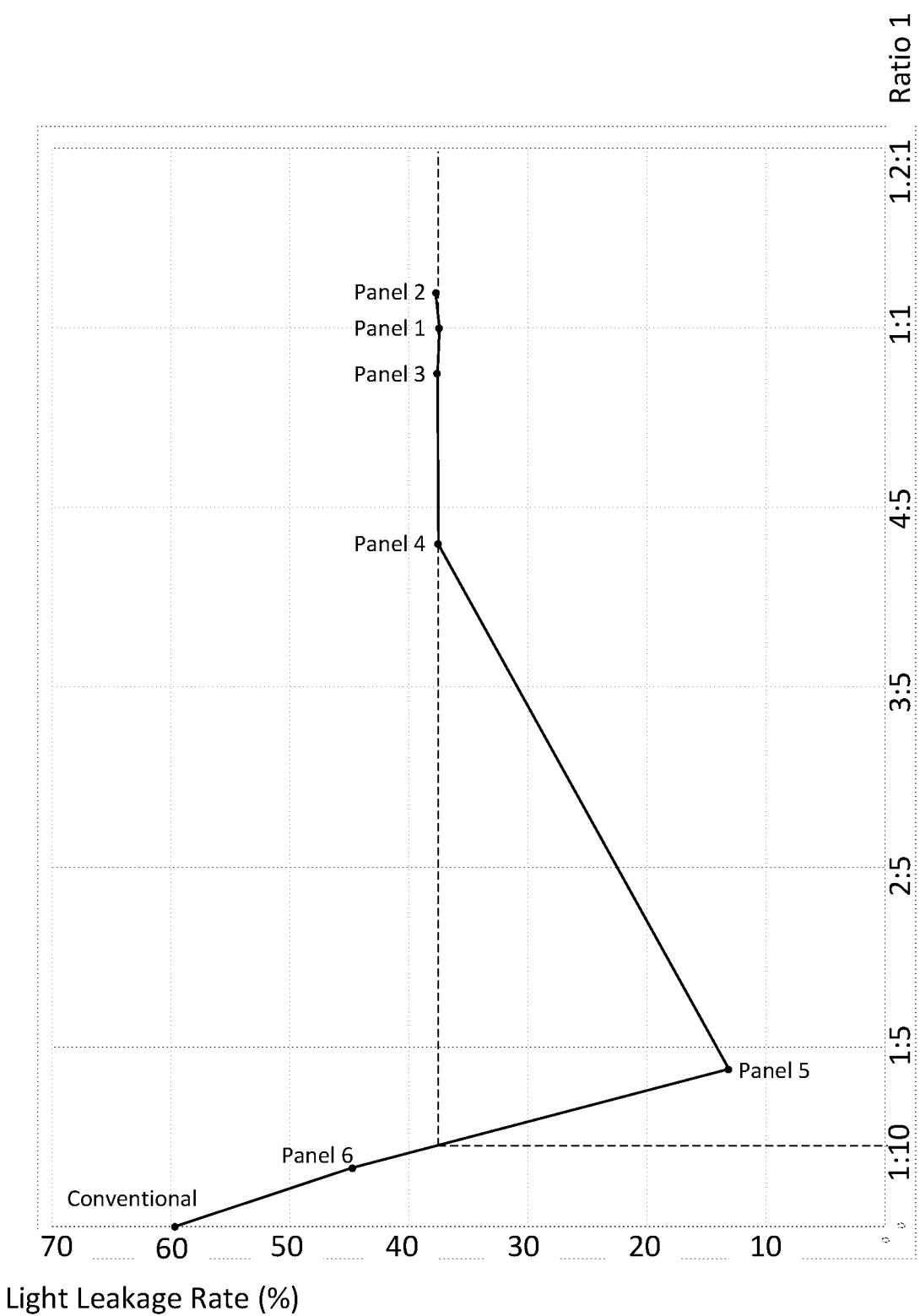
FIG. 10 is a chart illustrating a correlation between light leakage rate and a ratio of the width of the conductive material column to the width of the corresponding black matrix column ("Ratio 1").

FIG. 10 is a chart illustrating a correlation between light leakage rate and a ratio of the width of the conductive material column to the width of the corresponding black matrix column ("Ratio 1"). As shown in FIG. 10, a relatively low light leakage rate may be achieved when the ratio of the width of the conductive material column to the width of the corresponding black matrix column is in the range of approximately 1:10 to approximately 1.1:1. Similarly, a relatively small light leakage distance (not shown in the figure) may be achieved when the ratio of the width of the conductive material column to the width of the corresponding black matrix column is in the range of approximately 1:10 to approximately 1.1:1.

Figure 11:
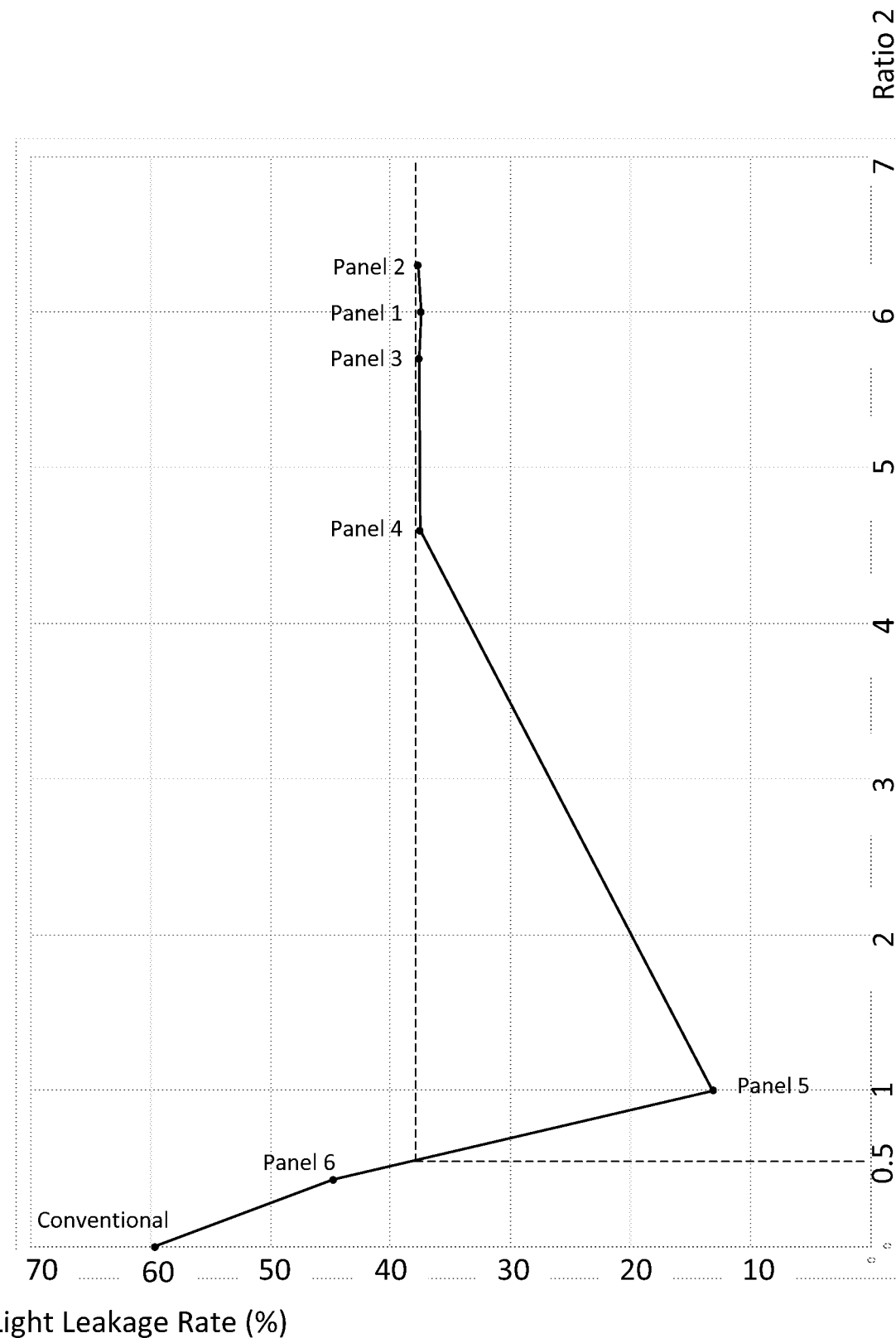
FIG. 11 is a chart illustrating a correlation between light leakage rate and a ratio of the width of the conductive material column to the width of the corresponding data line ("Ratio 2").

FIG. 11 is a chart illustrating a correlation between light leakage rate and a ratio of the width of the conductive material column to the width of the corresponding data line ("Ratio 2"). As shown in FIG. 10, a relatively low light leakage rate may be achieved when the ratio of the width of the conductive material column to the width of the corresponding data line is in the range of approximately 0.5:1 to approximately 6.3:1. Similarly, a relatively small light leakage distance (not shown in the figure) may be achieved when the ratio of the width of the conductive material column to the width of the corresponding data line is in the range of approximately 0.5:1 to approximately 6.3:1.

Accordingly, in another aspect, the present disclosure provides a novel display substrate for a high aperture ratio liquid crystal display panel. In some embodiments, the display substrate includes a base substrate; a black matrix layer on the base substrate including a plurality black matrix rows and a plurality of black matrix columns intersecting each other; and a conductive material layer on the base substrate including a plurality of conductive material columns corresponding to the plurality of black matrix columns. A projection of each of the plurality of conductive material columns on the base substrate at least partially overlaps with that of a corresponding black matrix column.

In some embodiments, a width of each of the plurality of conductive material columns is substantially equal to or less than that of the corresponding black matrix column. Optionally, a ratio of a width of each of the plurality of conductive material columns to a width of the corresponding black matrix column is in the range of approximately 1:10 to approximately 1.1:1, e.g., approximately 1:10 to approximately 2.5:10, approximately 1.5:10 to approximately 1:5, approximately 1.7:10 to approximately 1.8:10. Optionally, the ratio of a width of each of the plurality of conductive material columns to the width of the corresponding black matrix column is approximately 1.75:10.

Figure 12:
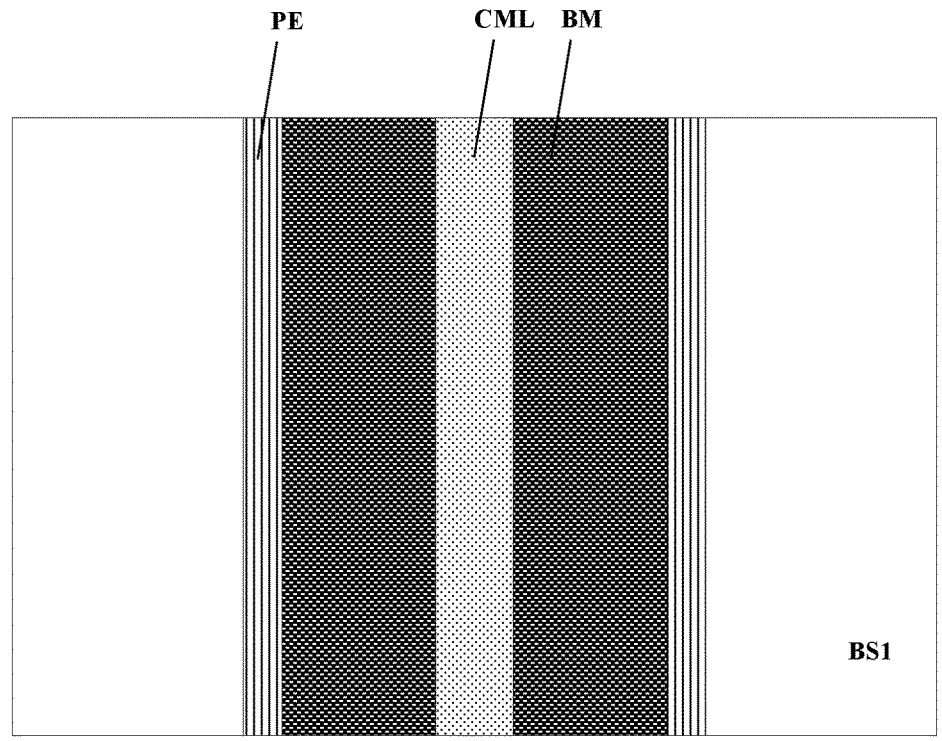
FIG. 12 is a plan view of a respective one of the plurality of conductive material columns and a respective one of the plurality of black matrix columns in a liquid crystal display panel in some embodiments according to the present disclosure.

FIG. 12 is a plan view of a respective one of the plurality of conductive material columns and a respective one of the plurality of black matrix columns in a liquid crystal display panel in some embodiments according to the present disclosure. As shown in FIG. 12, in some embodiments, an orthographic projection of a respective one of the plurality of conductive material columns CML on the base substrate BS1 at least partially overlaps with an orthographic projection of a respective one of the plurality of black matrix columns BM on the base substrate BS1. In some embodiments, the orthographic projection of the respective one of the plurality of black matrix columns BM on the base substrate BS1 partially overlaps with an orthographic projection of the pixel electrode layer PE on the base substrate BS1.

Figure 13:
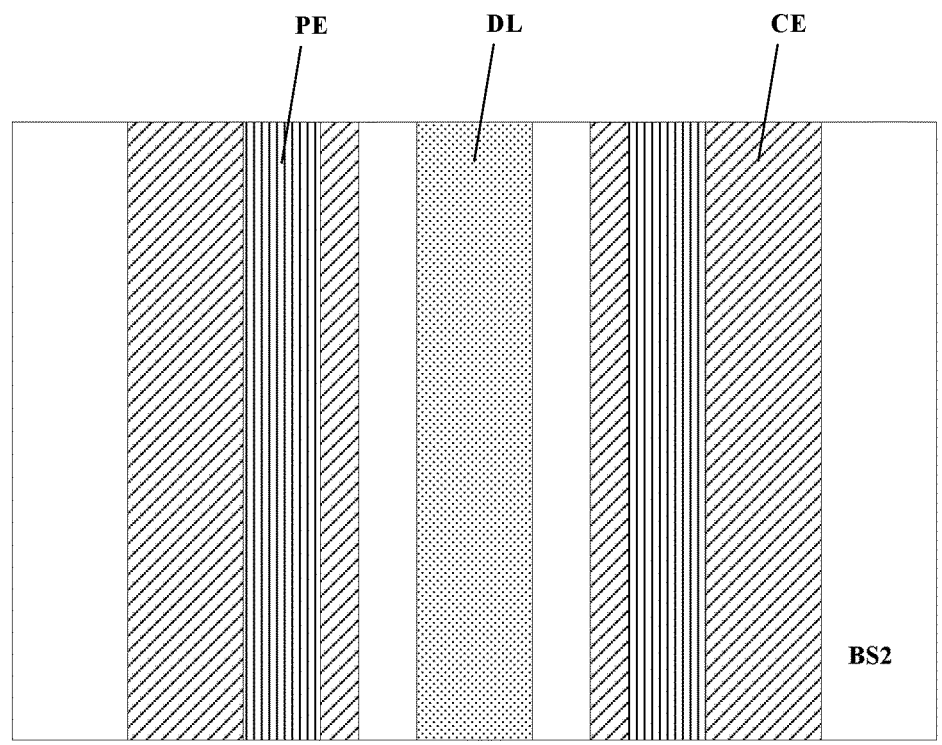
FIG. 13 is a plan view of a respective one of the plurality of columns of data lines, a common electrode layer, and a pixel electrode layer in a liquid crystal display panel in some embodiments according to the present disclosure.

FIG. 13 is a plan view of a respective one of the plurality of columns of data lines, a common electrode layer, and a pixel electrode layer in a liquid crystal display panel in some embodiments according to the present disclosure. Referring to FIG. 13, in some embodiments, an orthographic projection of a respective one of the plurality of columns of data lines DL on the base substrate BS1 is non-overlapping with an orthographic projection of the common electrode layer CE on the base substrate BS1. In some embodiments, an orthographic projection of a respective one of the plurality of columns of data lines DL on the base substrate BS1 is non-overlapping with an orthographic projection of the pixel electrode layer PE on the base substrate BS1.

In some embodiments, a ratio of the width of the conductive material column to the width of the corresponding data line is in the range of approximately 0.5:1 to approximately 6.3:1, e.g., approximately 0.5:1 to approximately 1.5:1, approximately 1.5:1 to approximately 2.5:1, approximately 2.5:1 to approximately 3.5:1, approximately 3.5:1 to approximately 4.5:1, approximately 4.5:1 to approximately 5.5:1, approximately 5.5:1 to approximately 6.3:1. In some embodiments, a width of the conductive material column is in the range of approximately 1.75 µm to approximately 22.05 µm, e.g., approximately 1.75 µm to approximately 5.25 µm, approximately 5.25 µm to approximately 8.75 µm, approximately 8.75 µm to approximately 12.25 µm, approximately 12.25 µm to approximately 15.75 µm, approximately 15.75 µm to approximately 19.25 µm, approximately 19.25 µm to approximately 22.05 µm.

In some embodiments, a width of the conductive material column is in the range of approximately 1.75 µm to approximately 5.25 µm, e.g., approximately 2.1 µm to approximately 4.9 µm, approximately 2.45 µm to approximately 4.55 µm, approximately 2.8 µm to approximately 4.2 µm, approximately 3.15 µm to approximately 3.85 µm, or approximately 3.325 µm to approximately 3.675 µm. Optionally, the width of the conductive material column is in the range of approximately 2.8 µm to approximately 4.2 µm. Optionally, the width of the conductive material column is approximately 3.5 µm.

In some embodiment, a width of the black matrix column is in the range of approximately 23 µm to approximately 20 µm, e.g., approximately 22 µm to approximately 20 µm, approximately 21 µm to approximately 20 µm. Optionally, a width of the black matrix column is approximately 20 µm.

Optionally, the conductive material layer is on a side of the black matrix layer proximal to the base substrate in the counter substrate, i.e., the black matrix layer is on a side of the conductive material layer distal to the base substrate in the counter substrate. Optionally, the black matrix layer is on a side of the conductive material layer proximal to the base substrate in the counter substrate, i.e., the conductive material layer is on a side of the black matrix layer distal to the base substrate in the counter substrate. Optionally, the black matrix layer may have two sub-layers, and the conductive material layer is sandwiched between the two sub-layers of the black matrix layer.

In another aspect, the present disclosure provides a method of fabricating a display substrate for a liquid crystal display panel. In some embodiments, the fabricating method includes forming a black matrix layer including a plurality black matrix rows and a plurality of black matrix columns intersecting each other on a base substrate; and forming a conductive material layer including a plurality of conductive material columns corresponding to the plurality of black matrix columns on the base substrate. The conductive material layer is formed so that a projection of each of the plurality of conductive material columns on the base substrate at least partially overlaps with that of a corresponding black matrix column.

In another aspect, the present disclosure provides a method of fabricating a liquid crystal display panel. In some embodiments, the method includes forming a counter substrate, and forming an array substrate facing the counter substrate. Optionally, the step of forming the array substrate includes forming a data line layer including a plurality of columns of data lines. Optionally, the step of forming the counter substrate includes forming a conductive material layer including a plurality of conductive material columns for preventing light leakage, the plurality of conductive material columns corresponding to the plurality of black matrix columns on the base substrate, and corresponding to the plurality of columns of data lines. Optionally, the method further includes forming a black matrix layer comprising a plurality of black matrix columns corresponding to the plurality of conductive material columns and the plurality of columns of data lines. Optionally, the black matrix layer is formed in the counter substrate. Optionally, the black matrix layer is formed in the array substrate. The conductive material layer and the black matrix layer are formed so that a projection of each of the plurality of conductive material columns on the base substrate at least partially overlaps with that of a corresponding black matrix column.

In some embodiments, the method further includes electrically connecting the conductive material layer to a low voltage terminal in the display panel. Optionally, the method includes electrically connecting the conductive material layer to ground. Optionally, the method includes electrically connecting the conductive material layer to a common electrode or a common electrode signal line, e.g., a common electrode layer or a common electrode signal line in the array substrate. Optionally, the method includes forming a lead wire, and electrically connecting the conductive material layer to the common electrode layer or the common electrode signal line in the array substrate through the lead wire. Optionally, the method further includes forming a sealant layer for sealing the array substrate and the counter substrate together, the sealant layer including a plurality of conductive components (e.g., gold balls); and electrically connecting the conductive material layer to the common electrode layer or the common electrode signal line in the array substrate through the conductive components in the sealant layer. Optionally, the step of forming the array substrate includes forming a common electrode layer electrically connected to the conductive material layer in the counter substrate.

In some embodiments, the conductive material layer and the data line layer are formed so that a ratio of a width of each of the plurality of conductive material columns to a width of a corresponding column of data line is in the range of approximately 0.5:1 to approximately 1.5:1, e.g., approximately 0.6:1 to approximately 1.4:1, approximately 0.7:1 to approximately 1.3:1, approximately 0.8:1 to approximately 1.2:1, approximately 0.9:1 to approximately 1.1:1, or approximately 0.95:1 to approximately 1.05:1. Optionally, the ratio of the width of each of the plurality of conductive material columns to the width of a corresponding column of data line is in the range of approximately 0.8:1 to approximately 1.2:1. Optionally, the width of each of the plurality of conductive material columns is substantially equal to the width of the corresponding column of data line.

In some embodiments, the step of forming the array substrate includes forming a common electrode layer, forming a first insulating layer on the common electrode layer; forming the data line layer on a side of the first insulating layer distal to the common electrode layer, forming a second insulating layer on a side of the data line layer distal to the first insulating layer; and forming a pixel electrode layer on a side of the second insulating layer distal to the data line layer. Optionally, the common electrode layer is formed to be electrically connected to the conductive material layer in the counter substrate. Optionally, a ratio of a width of each of the plurality of conductive material columns to a width of a corresponding column of data line is in the range of approximately 0.8:1 to approximately 1.2:1. Optionally, the width of each of the plurality of conductive material columns is substantially equal to the width of the corresponding column of data line.

Optionally, the step of forming the counter substrate further includes forming a color filter layer. Optionally, the step of forming the color filter layer includes forming a plurality of color filter blocks of different colors. For example, the color filter layer may include a red color filter block, a green color filter block, and a blue color filter block. The color filter layer is formed to be substantially in the subpixel region, and the black matrix layer is formed to be substantially in the inter-subpixel region.

In another aspect, the present disclosure provides a liquid crystal display apparatus having a liquid crystal display panel described herein or fabricated by a method described herein. Examples of appropriate display apparatuses includes, but are not limited to, an electronic paper, a mobile phone, a tablet computer, a television, a monitor, a notebook computer, a digital album, a GPS, etc.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A liquid crystal display panel, comprising:
an array substrate comprising a common electrode layer in a subpixel region of the liquid crystal display panel, a first insulating layer on the common electrode layer, a data line layer including a plurality of columns of data lines and on a side of the first insulating layer away from the common electrode layer, a second insulating layer on a side of the data line layer away from the first insulating layer, and a pixel electrode layer on a side of the second insulating layer away from the data line layer;
a counter substrate facing the array substrate, the counter substrate comprising a base substrate and a conductive material layer on the base substrate, the conductive material layer comprising a plurality of conductive material columns for preventing light leakage; and
a black matrix layer comprising a plurality of black matrix columns;
wherein an orthographic projection of a respective one of the plurality of conductive material columns on the base substrate at least partially overlaps with an orthographic projection of a respective one of the plurality of black matrix columns on the base substrate.

2. The liquid crystal display panel of claim 1, wherein the conductive material layer is configured to be provided with a common electrode voltage.

3. The liquid crystal display panel of claim 1, wherein the conductive material layer is a floating electrode layer having a floating potential and is not electrically connected to any voltage supply unit.

4. The liquid crystal display panel of claim 1, wherein a width of each of the plurality of conductive material columns is substantially equal to or less than that of the corresponding black matrix column.

5. The liquid crystal display panel of claim 1, wherein a ratio of a width of each of the plurality of conductive material columns to a width of the corresponding black matrix column is in the range of approximately 1:10 to approximately 1.1:1.

6. The liquid crystal display panel of claim 1, wherein a ratio of a width of each of the plurality of conductive material columns to a width of a corresponding column of data line is in the range of approximately 0.8:1 to approximately 1.2:1.

7. The liquid crystal display panel of claim 6, wherein the width of each of the plurality of conductive material columns is substantially equal to the width of the corresponding column of data line.

8. The liquid crystal display panel of claim 1, wherein the common electrode layer is electrically connected to the conductive material layer in the counter substrate.

9. The liquid crystal display panel of claim 1, wherein the conductive material layer is made of a transparent metal material.

10. The liquid crystal display panel of claim 1, wherein the black matrix layer is in the counter substrate; and the conductive material layer is on a side of the black matrix layer facing the base substrate of the counter substrate.

11. A liquid crystal display apparatus, comprising a liquid crystal display panel of claim 1.

12. A method of fabricating a liquid crystal display panel, comprising forming an array substrate and forming a counter substrate facing the array substrate;
wherein forming the array substrate comprises forming a common electrode layer in a subpixel region of the liquid crystal display panel, forming a first insulating layer on the common electrode layer, forming a data line layer including a plurality of columns of data lines and on a side of the first insulating layer away from the common electrode layer, forming a second insulating layer on a side of the data line layer away from the first insulating layer, and forming a pixel electrode layer on a side of the second insulating layer away from the data line layer; and
forming the counter substrate comprises forming a conductive material layer on a base substrate, the conductive material layer formed to comprise a plurality of conductive material columns for preventing light leakage;
the method further comprising forming a black matrix layer comprising a plurality of black matrix columns;
wherein the black matrix layer is formed so that an orthographic projection of a respective one of the plurality of conductive material columns on the base substrate at least partially overlaps with an orthographic projection of a respective one of the plurality of black matrix columns on the base substrate.

13. The method of claim 12, wherein the conductive material layer is formed as a floating electrode layer having a floating potential and is not electrically connected to any voltage supply unit.

14. The method of claim 12, wherein a ratio of a width of each of the plurality of conductive material columns to a width of a corresponding column of data line is in the range of approximately 0.8:1 to approximately 1.2:1.

15. The method of claim 12, wherein the common electrode layer is formed to be electrically connected to the conductive material layer in the counter substrate.

16. The liquid crystal display panel of claim 1, wherein an orthographic projection of a respective one of the plurality of columns of data lines on the base substrate is non-overlapping with an orthographic projection of the common electrode layer on the base substrate.

17. The liquid crystal display panel of claim 1, wherein an orthographic projection of a respective one of the plurality of columns of data lines on the base substrate is non-overlapping with an orthographic projection of the pixel electrode layer on the base substrate.

18. The liquid crystal display panel of claim 1, wherein the orthographic projection of the respective one of the plurality of black matrix columns on the base substrate partially overlaps with an orthographic projection of the pixel electrode layer on the base substrate.

19. The method of claim 12, wherein an orthographic projection of a respective one of the plurality of columns of data lines on the base substrate is non-overlapping with an orthographic projection of the common electrode layer on the base substrate.

20. The method of claim 12, wherein an orthographic projection of a respective one of the plurality of columns of data lines on the base substrate is non-overlapping with an orthographic projection of the pixel electrode layer on the base substrate.

* * * * *